Figure 1:
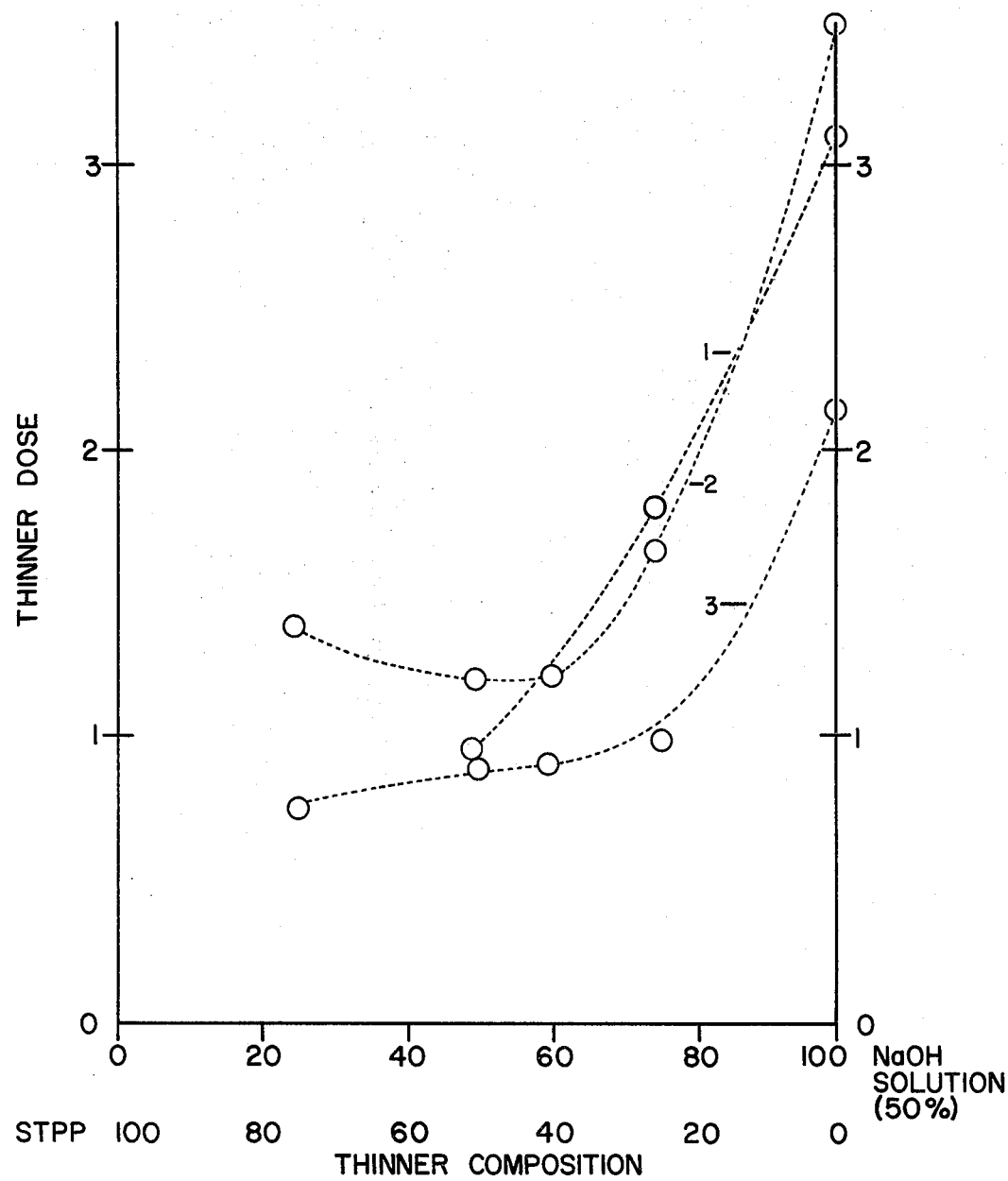

United States Patent [19]

Lehman et al.

[11] 4,374,817

[45] Feb. 22, 1983

[54] FORMULATION OF PHOSPHATE ROCK SLURRIES

[75] Inventors: Richard L. Lehman, Belle Mead; John A. Shepherd, Jamesburg, both of N.J.

[73] Assignee: FMC Corporation, Phildelphia, Pa.

[21] Appl. No.: 294,964

[22] Filed: Aug. 21, 1981

[51] Int. Cl.$^3$ .................. C01B 25/16; C01F 11/44
[52] U.S. Cl. .................. 423/319; 423/167; 241/16
[58] Field of Search .............. 423/319, 167; 241/16, 241/17

[56] References Cited

U.S. PATENT DOCUMENTS 4,042,666  8/1977  Rice et al. .................. 423/167
4,044,107  8/1977  Houghtaling .................. 423/167
4,113,184  9/1978  Loughrie .................. 241/15

Primary Examiner—O. R. Vertiz
Assistant Examiner—Gregory A. Heller
Attorney, Agent, or Firm—Edwin B. Cave; Frank Ianno

[57] ABSTRACT

The viscosity of phosphate rock slurries is reduced by incorporating in the slurry both sodium tripolyphosphate and an alkaline material, particularly sodium hydroxide. The combined amount of these two materials required to achieve a given viscosity reduction is significantly lower than the weighted average of the amounts required for each to produce individually the same viscosity reduction. The defined alkaline materials, other than sodium hydroxide, are sodium carbonate, ammonium hydroxide and potassium hydroxide.

12 Claims, 2 Drawing Figures

FORMULATION OF PHOSPHATE ROCK SLURRIES

This invention relates to phosphate rock slurries of reduced viscosity and their production.

In the processing of phosphate rock as, for instance, in the wet process of producing phosphoric acid, it is common practice to produce a slurry of ground phosphate rock in an aqueous medium, in which form it is conveniently pumped through conduit facilities to the further processing equipment. Since the aqueous portion of the slurry constitutes a diluent in the further processing of the phosphate, efficiency of that processing is ordinarily enhanced by maintaining the solids content of the slurry at the highest feasible value and the aqueous content at a minimum, while maintaining the viscosity of the slurry at the level necessary for processing. However, the difficulty of pumping slurries increases with viscosity which increases with increased solids content.

In order to maximize the permissible solids content of a slurry while maintaining its viscosity within the limit found to be compatible with particular equipment designs, the addition to the slurry of various viscosity reducing ingredients has been proposed. It is known to add alkaline materials, particularly caustic soda, soda ash, ammonium hydroxide or caustic potash, which maintain a significantly alkaline pH in the slurry and can provide a substantially lowered viscosity for a given solids content. It is also known that the lowering of viscosity in phosphate rock slurries can be achieved by the addition of surfactants or of inorganic materials, such as sodium tripolyphosphate, which though not surfactants are known to act as suspending or dispersing agents for finely divided solids in aqueous media, in part by their sequestration of polyvalent metallic cation flocculants which may be present and in part by the chemisorption of the large polyvalent anions on the surface of the mineral. Although both the overall and the relative effectiveness of given amounts of these additives in reducing viscosity tends to vary with the composition of the phosphate rock, particularly with the amount and nature of its clay content, it has been found to be generally more advantageous from an economic standpoint to use the alkaline materials, particularly sodium hydroxide, for this purpose. This has been true because of lower material cost despite the fact that substantially larger amounts of the alkaline materials must be used to achieve given viscosity reductions and despite the fact that their use requires the expense of adding acid for their neutralization in subsequent processing.

It has now been found that a synergism results when sodium tripolyphosphate is used in conjunction with one of the aforesaid alkaline materials, making it advantageous to use both materials together, instead of either alone, for the reduction of the viscosity of phosphate rock slurries. This synergism is readily observed when progressively increasing proportions of sodium hydroxide used as a viscosity reducing additive in phosphate rock slurries are replaced by sodium tripolyphosphate.

The combined amount of the two materials required to achieve a given reduced viscosity was found to be significantly less than the weighted average of the required individual amounts of the separate materials. As a result, instead of the decrease in cost effectiveness to be expected as increasing amounts of the ordinarily less cost effective sodium tripolyphosphate are substituted for the ordinarily more cost effective sodium hydroxide, quite the contrary occurs. Over a substantial range of the combined materials, the cost effectiveness is better for the combination than for either individual material.

The present invention resides in an aqueous phosphate rock slurry, and its preparation, which slurry contains therein, as additives, both sodium tripolyphosphate and an alkaline material, particularly an alkaline material selected from the group consisting of sodium hydroxide, sodium carbonate, ammonium hydroxide, potassium hydroxide and mixtures thereof, which additives act together to reduce the viscosity of the slurry to a pumpable level.

The details of the invention will be described with respect to phosphate rock slurries wherein such additives consist of a mixture of sodium tripolyphosphate with sodium hydroxide, the more common alkaline material used in the preparation of such slurries. These materials can be added to the slurry at any stage in its preparation but are most conveniently added during the wet grinding of the phosphate rock. They can be added in any convenient form, particularly in dry form or in aqueous solution or as a stable aqueous suspension of the two components. Sodium hydroxide is conveniently available commercially in a 50% aqueous solution; sodium tripolyphosphate is ordinarily available as a dry powder or granular material. They can be added separately in these or other forms or added as a mixture.

Figure 2:
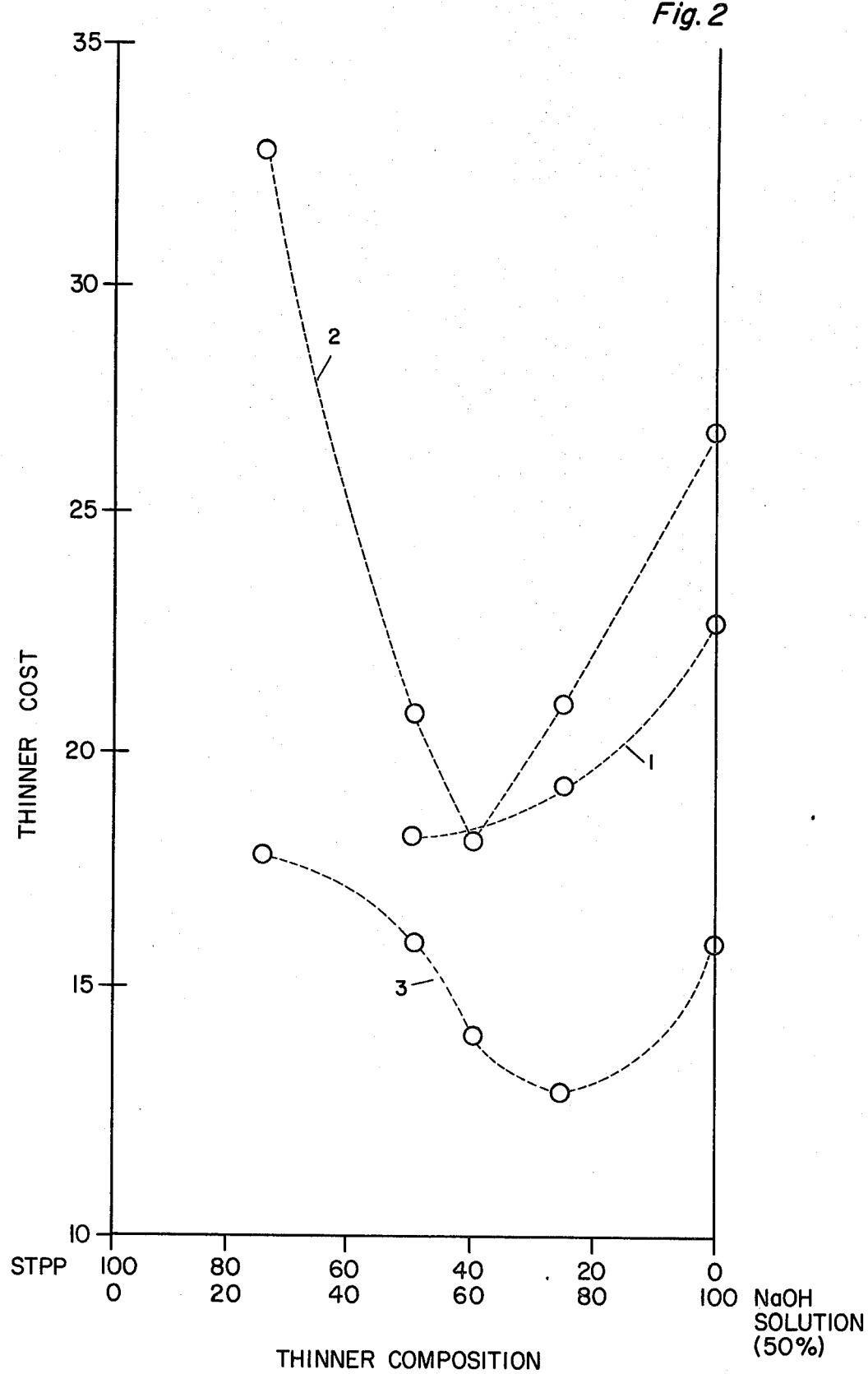

The benefits to be derived from the synergism of these two materials in reducing the viscosity of phosphate rock slurries as illustrated by the accompanying drawing in which:

FIG. 1 is a chart showing how the dosages of the viscosity reducing additive required to achieve a typical pumpable viscosity in high solids slurries of three different ground phosphate rocks varied as sodium hydroxide was replaced by increasing proportions of sodium tripolyphosphate; and FIG. 2 is a chart showing the change in cost effectiveness of the additive for treating slurries of the three phosphate rocks as the active composition of the additive was changed from sodium hydroxide alone to a mixture containing increasing amounts of sodium tripolyphosphate.

In FIGS. 1 and 2, the individual points shown were derived from actual measurements. The lines connecting the points are included only for ease in relating the corresponding points. The individual points were derived as follows.

Aqueous slurries of three representative samples of phosphate rock from the process stream of a phosphoric acid plant in Central Florida were obtained. These slurries contained about 70% by weight of solids and typically had Brookfield viscosities within the range of 3000 to 5000 centipoises. These slurries were divided, for testing, into lots of 300 grams each, which were standardized at a solids content of 75% by weight by the addition of dry ground phosphate rock from the slurry. The viscosity reducing agent, or thinner, was then added either as a 50% aqueous solution of sodium hydroxide alone or as both sodium tripolyphosphate and 50% aqueous sodium hydroxide in the proportions by weight indicated by the ordinate positions of the points in FIGS. 1 and 2. Brookfield viscosity of each lot was determined with varying amounts of added thinner of each composition. From plots of viscosity against amount of added thinner, there was determined for each of the three rock samples and for each thinner composition, the amount of thinner required to reduce the Brookfield viscosity of the slurry to 2000 centipoises, which corresponds to the processing viscosity. The viscosities were measured by conventional techniques using a Brookfield LVT viscometer at appropriate RPM's and spindle selection.

The amount of each thinner composition thus determined as required to reduce the viscosity to 2000 centipoises is plotted in FIG. 1 against the relative proportions by weight of sodium tripolyphosphate and 50% aqueous solution of sodium hydroxide in each thinner composition. The amount of thinner required in each case is expressed in FIG. 1 in terms of pounds of combined thinner components (weight of sodium tripolyphosphate plus weight of 50% aqueous sodium hydroxide) per ton of wet phosphate rock as fed to the rock mill. The phosphate rock fed to the milling operation ordinarily contains in the vicinity of 15% water and it is in terms of this wet rock that the thinner requirement is expressed in FIG. 1.

In FIG. 1 the points lying along lines labeled #1, #2 and #3 represent the amounts of thinner required to reduce to 2000 centipoises the viscosities of slurries of phosphate rock samples #1, #2 and #3 respectively. It can be seen that the points for each rock sample define a path which is significantly concave upwards, indicating that as sodium tripolyphosphate is progressively substituted for increasing portions of the sodium hydroxide thinner, the combined amount required is substantially less than the simple weighted average, which would appear as a straight line connecting the intersection of the path with the ordinate lines at both sides.

The economic effect of this synergism is shown in FIG. 2, the points of which were derived from the points of FIG. 1, using as nearly as feasible the somewhat fluctuating current prices of sodium tripolyphosphate, 50% aqueous sodium hydroxide and sulfuric acid required to neutralize the sodium hydroxide. In FIG. 2 is plotted the effective cost of the thinner made up of varying proportions of sodium tripolyphosphate and 50% aqueous sodium hydroxide as applied to slurries of the three phosphate rock samples. This cost is expressed in cents per ton of wet rock. In calculating this cost, the market price of the amount of sulfuric acid required to neutralize the caustic and the sodium phosphate was added to the market price of these chemicals. In addition, the value of the $P_2O_5$ added to the process by the sodium tripolyphosphate was subtracted from the cost of the sodium tripolyphosphate.

It can be seen in FIG. 2 that for rock samples #2 and #3 a definite minimum cost is achieved when between about 20% and about 40% by weight of the aqueous sodium hydroxide is replaced by sodium tripolyphosphate. For rock sample #1 the cost is significantly reduced as up to 50% of the aqueous sodium hydroxide is replaced by sodium tripolyphosphate. Although the testing of sample #1 was not extended to the larger substitutions of sodium tripolyphosphate required to establish the existence of a minimum cost, it is to be expected from the available tests as plotted in FIG. 2 that a minimum cost would occur in the vicinity of a thinner composition comprised of equal parts of sodium tripolyphosphate and 50% aqueous sodium hydroxide.

It is thus apparent that the two different effects known in the art, that is, (1) viscosity reduction of phosphate rock slurries by raising the pH by addition of alkaline materials and (2) viscosity reduction by addition of sodium tripolyphosphate as a dispersant which functions in part by ion sequestration and in part by anion chemisorption, are not merely additive but can be combined to produce an unexpected and synergistic advantage. It is to be expected that this advantage will be obtained when sodium tripolyphosphate is used in conjunction with any alkaline material known in the art to reduce the viscosity of phosphate rock slurries by raising their pH. Thus a combined sodium carbonate and sodium tripolyphosphate thinner will be acceptable where evolution of carbon dioxide upon subsequent acidification of the slurry is not objectionable. Similarly, combinations of sodium tripolyphosphate with ammonium hydroxide or potassium hydroxide are considered to be within the broader scope of the present invention.

The present invention is applicable to any phosphate rock slurry where viscosity reduction will be advantageous. It is ordinarily uneconomic for such slurries to contain less than 60% solids in processing, and it is difficult to obtain adequate viscosity reduction when they contain more than 80% solids. It is more desirable economically that they contain at least 65% solids and preferably at least 70%. They will ordinarily not contain more than about 75% solids.

The present invention is applicable to any of the commercially produced phosphate rock slurries and is not dependent upon a particular particle size of ground phosphate rock so long as it can be effectively slurried. Ordinarily at least 95%, and preferably at least 99%, of such particles will pass a 425 $\mu$m sieve. It is further common for at least about 70% to pass a 150 $\mu$m sieve. The particle size distribution of two typical samples of slurried ground Central Florida phosphate rock are as follows:

| Sieve Size | Percent of Sample | |
| --- | --- | --- |
| | A | B |
| Retained at 425 $\mu$m | 2.5 | 0.5 |
| Retained at 150 $\mu$m | 21.9 | 23.8 |
| Retained at 75 $\mu$m | 27.8 | 31.3 |
| Retained at 45 $\mu$m | 36.4 | 34.1 |
| Passing 45 $\mu$m | 11.4 | 10.3 |

An amount of thinner according to the present invention is added as required to reduce the slurry viscosity to the level needed for handling in the particular equipment. Ordinarily a Brookfield viscosity below 2500 centipoises will be desired. More commonly a viscosity not exceeding 2000 centipoises will be advantageous. In some cases it may be necessary to add sufficient thinner to reduce the viscosity to 1500 or 1200 centipoises or even lower. With slurries of higher solids contents and higher viscosities, larger amounts of thinner will be required to achieve desired viscosity reductions. With most phosphate rock slurries, the amount of thinner of the present invention added will lie in the range of about ½ pound to 2 pounds, dry weight, per ton of wet rock.

It is apparent that the benefits of the present invention begin to be achieved when as little as 1% of an alkaline material thinner for phosphate rock slurries is replaced by sodium tripolyphosphate. In general the greatest benefit will be obtained when, for instance, the ratio of sodium tripolyphosphate to sodium hydroxide (calculated as 100% NaOH) used as combined thinner is between about 1:9 and about 4:1. More preferable ratios will ordinarily be within the range of 1:4 and 3:1 or even within the range of 1:3 and 2:1. Similar ratios of sodium tripolyphosphate to alkaline material will be expected to be advantageous when other alkaline materials are used in place of, or in conjunction with, sodium hydroxide.

The thinner of the present invention can be added to the phosphate rock slurry at any point in the preparation of the slurry. A convenient point of addition is during initial wet grinding of the phosphate rock. The thinner can be added, however, after the grinding is completed and the slurry formed. The components of the thinner can be mixed together prior to addition of the slurry or can be added separately at the same or at different points in the slurry preparation.

We claim:

1. An aqueous slurry of particulate phosphate rock, the solids content of said slurry being between about 60% and about 80% by weight, said slurry having dissolved therein, in an amount sufficient to impart to the slurry a Brookfield viscosity below 2500 centipoises, both sodium tripolyphosphate and an alkaline material selected from the group consisting of sodium hydroxide, sodium carbonate, ammonium hydroxide, potassium hydroxide and mixtures thereof.

2. An aqueous slurry of particulate phosphate rock, the solids content of which is between about 60% and about 80% by weight, said slurry having dissolved therein both sodium tripolyphosphate and sodium hydroxide in combined amount sufficient to impart to the slurry a Brookfield viscosity below 2500 centipoises.

3. A slurry as defined in claim 2 wherein the content of phosphate rock is at least about 70% by weight.

4. A slurry as defined in claim 3 wherein the viscosity does not exceed 2000 centipoises.

5. A slurry as defined in claim 2, 3 or 4 wherein the dry weight ratio of sodium tripolyphosphate to sodium hydroxide is between 1:9 and 4:1.

6. A slurry as defined in claim 5 wherein said ratio is between 1:4 and 3:1.

7. A slurry as defined in claim 5 wherein said ratio is between 1:3 and 2:1.

8. In the process of producing an aqueous slurry of ground phosphate rock which slurry has a solids content between about 60% and about 80% by weight and a reduced Brookfield viscosity below about 2500, which process comprises grinding phosphate rock and dispersing the ground particles of said rock in an aqueous medium, the improvement which comprises providing said reduced viscosity by incorporating in said slurry at some point in its preparation both sodium tripolyphosphate and an alkaline material selected from the group consisting of sodium hydroxide, potassium hydroxide and mixtures thereof.

9. A process as defined in claim 8 wherein the alkaline material is sodium hydroxide.

10. A process as defined in claim 9 wherein the solids content of the slurry is at least about 70% and the viscosity of the slurry does not exceed about 2000 centipoises.

11. A process as defined in claim 8 or 10 wherein the dry weight ratio of sodium tripolyphosphate to alkaline material in the slurry lies between about 1:9 and about 4:1.

12. A process as defined in claim 11 wherein the said ratio lies between about 1:3 and 2:1.

* * * * *